(12) United States Patent
Arena et al.

(10) Patent No.: US 6,728,687 B2
(45) Date of Patent: Apr. 27, 2004

(54) ELECTRONIC CIRCUIT FOR CONTROLLING A MOVEMENT BY A FUZZY CELLULAR ARCHITECTURE

(75) Inventors: Paolo Arena, Catania (IT); Marco Branciforte, Catania (IT); Giovanni Di Bernardo, Mascalucia (IT); Luigi Occhipinti, Ragusa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 534 days.

(21) Appl. No.: 09/727,302

(22) Filed: Nov. 29, 2000

(65) Prior Publication Data

US 2002/0111700 A1 Aug. 15, 2002

(30) Foreign Application Priority Data

Nov. 30, 1999 (EP) .............................. 99830744

(51) Int. Cl.⁷ .................................. G06G 7/00

(52) U.S. Cl. .............................. 706/3; 706/4

(58) Field of Search ................. 706/1–11, 3, 4

(56) References Cited

U.S. PATENT DOCUMENTS

| | | | | |
|---|---|---|---|---|
| 5,245,695 A | * | 9/1993 | Basehore ...................... | 706/4 |
| 5,412,752 A | * | 5/1995 | Basehore et al. ............. | 706/4 |
| 5,459,816 A | * | 10/1995 | Basehore et al. ............. | 700/50 |
| 5,673,365 A | * | 9/1997 | Basehore et al. ............. | 706/46 |
| 5,806,052 A | * | 9/1998 | Bonissone et al. ............ | 706/4 |
| 5,974,350 A | * | 10/1999 | Davis et al. .................. | 701/36 |
| 6,442,534 B1 | * | 8/2002 | Au et al. ....................... | 706/1 |

FOREIGN PATENT DOCUMENTS

| | | | |
|---|---|---|---|
| EP | 0818283 | 1/1998 | ............. B25J/9/16 |

OTHER PUBLICATIONS

Changjiu zhou, Da Ruan, Integration of linguistic and numerical information for biped control, Robotics and Autonomous Systems, NL, Elsevier Science Publishers, Amsterdam, vol. 28, No. 1, Jul. 31, 1999. pp. 53–70.*

W, llg, K. Berns, Th. Muhlfriedel, R. Dillman, Hybrid learning concepts based on self–organizing neural networks for adaptive control of walking machines, Robotics & Autonomous Sys., NL, Elsevier Science Publishers, vol. 22, No. 3–4 1999, pp. 317–327.*

Cintia: a neuro–fuzzy real–time controller for low–power embedded systems Chiaberge, M.; Reyneri, L.M.; Micro, IEEE , vol.: 15 Issue: 3, Jun. 1995 pp.: 40–47.*

(List continued on next page.)

*Primary Examiner*—Anil Khatri
*Assistant Examiner*—Michael B. Holmes
(74) *Attorney, Agent, or Firm*—Lisa K. Jorgenson; Allen, Dyer, Doppelt, Milbrath & Gilchrist, P.A.

(57) ABSTRACT

A method of controlling the movements of a multi-actuator electro-mechanical system having a matrix of locally interconnected analog cells associated therewith is provided. Each cell represents a hardware implementation of a model of fuzzy inference rules. The model includes a fuzzy circuit architecture which may be implemented in an integrated circuit with VLSI CMOS technology that generates and controls a reaction diffusion mechanism typical of autowaves using a fuzzy neural network. The fuzzy neural network defines the functional relationships that may duplicate simultaneous reaction diffusion equations. The duplication of the simultaneous reaction diffusion equations is provided using two sets of fuzzy rules processing, in a linguistic manner, the state variables of the cells. An oscillatory type dynamic is imposed on each cell where two dynamic processes having different kinetic characteristics coexist.

27 Claims, 3 Drawing Sheets

OTHER PUBLICATIONS

Cintia: a neuro–fuzzy real time controller for low power embedded systems Reyneri, L.M.; Chiaberge, M.; Zocca, L.; (1994) Microelectronics for Neural Networks and Fuzzy Systems, Proceedings of the Fourth International Conference on, pp.: 392–403.*

A neuro–fuzzy systems for control applications Berardi, F.; Chiaberge, M.; Miranda, E.; Reyneri, L.M.; Neuro–Fuzzy Systems, 1996. AT'96., International Symposium on , Aug. 29–31, 1996 pp.: 121–128.*

Zhou et al., *Integration of linguistic and numerical information for biped control*, Robotics and Autonomous Systems, NL, Elsevier Science Publishers, Amstedam, vol. 28, No. 1, Jul. 31, 1999, pp. 53–70.

Ilg et al., *Hybrid learning concepts based on self–organizing neural networks for adaptive control of walking machines*, Robotics and Autonomous Systems, NL, Elsevier Science Publishers, Amsterdam, vol. 22, No. 3–4, Dec. 1, 1997, pp. 317–327.

* cited by examiner

ELECTRONIC CIRCUIT FOR CONTROLLING A MOVEMENT BY A FUZZY CELLULAR ARCHITECTURE

FIELD OF THE INVENTION

The present invention relates to electronic circuits, and, more particularly, to an electronic circuit for controlling movement through a fuzzy cellular architecture. That is, the invention relates to an electronic circuit for generating and controlling the movements of a multi-actuator electro-mechanical system. For example, such system may be of a type associated with a cellular architecture including a plurality of programmable cells interconnected locally to provide a logic/mathematical representation of the locomotive phenomenon. A corresponding conversion of the representation to commands or electric pulses for driving a plurality of actuators associated with the cells may be provided thereby.

The invention also concerns a method for generating and controlling the movements of a multi-actuator electro-mechanical system. Such system provides a logic/mathematical representation of the locomotive phenomenon and a corresponding conversion of the representation to commands or electric pulses through a cellular architecture associated with a plurality of actuators.

While the invention relates to the aspects of movement control in multi-actuator electro-mechanical systems, such as those used in robotics and industrial automation, it may also be applied to the movement of other mechanical systems. The following description makes reference to the above field of application for convenience of explanation only.

BACKGROUND OF THE INVENTION

As is well known in the art, recent developments in the neuro-biology field have shown through experimentation the principles which underlie the movement of certain invertebrates. Moreover, the details of movement at cellular and molecular levels are also being defined through mathematical equations. Such developments have been reported, for example, in an article entitled "Mathematical Biology" by J. D. Murray, published by Springer-Verlag, Berlin, 1989, and in "Common Principles of Motor Control in Vertebrates and Invertebrates" by G. K. Pearson in Ann. Rev. Neurosci., Vol. 16, pages 265-297, 1993.

The phenomena behind the movement of invertebrates, i.e., signal propagation to the nervous tissues, can now be described by particular solutions of differential equations to the partial derivatives in non-linear form. These equations are known as reaction diffusion equations. The nervous impulse generating/propagating mechanism can be related to a mathematical model including simultaneous differential equations of the second order generating local oscillations adapted to be diffused spatially through a suitable set of interactions between adjacent cells.

A reaction diffusion equation is expressed analytically by the following formulation:

$$\frac{\delta u}{\delta t} = f(u) + D\nabla^2 u \text{ and } \nabla^2 u = \frac{\delta u}{Sx^2} + \frac{\delta u}{\delta y^2} \quad (1)$$

where f(u) is a non-linear function of the reaction state "u," called a reaction function, and the term $\nabla^2 u$ is a Laplace operator, called "Laplacian," and represents a weighed diffusion term by a diffusion coefficient D.

The particular solutions of these equations, namely $u \in \Re^m$, $f \in \Re^m$, $D \in \Re^{m \times m}$, describe wave phenomena based on self-sustained oscillations which have all the features of a nervous impulse, i.e., an autonomous wave or auto-wave. Peculiar to auto-waves are features such as propagation through non-linear active media at the expense of the energy thereof, preservation of the wave amplitude and shape, absence of reflections from the walls, annihilation upon collision, and slow-fast dynamics.

In less differentiated living organisms, such as polychaeta and mollusks, it has been observed that motion is generated by activating or "firing" an extremely small number of neural cells forming part of the outer membrane of the animal. Furthermore, this outer membrane can synchronize itself together with the impulses generated by the "motor neurons."

Based upon these observations, it may be said that the most archaic version of movement involves propagating a nervous impulse along a membrane which is resistant to a medium, such as water or ground, where the locomotion takes place. In the simplest of moving organisms (e.g., certain mollusks and cuttlefishes) the locomotion is induced directly by propagation of the nervous impulse or auto-wave between neural cells which are distributed along the parts of the body that produce the movement.

In more developed animals, such as insects, the neural structure responsible for locomotion is organized at a higher level, but is still based upon reaction diffusion (RD) phenomena. In such organisms, the central nervous system includes a so-called central pattern generator (CPG) that is responsible for the transitions among different types of motion (slow, fast, swimming, etc.).

From an analytical standpoint, motion is determined, at a local level, by the propagation of an auto-wave through the locomotive neurons. At a central level, the type of the auto-wave is determined by a dynamic phenomenon of trajectories or spatial patterns known as a Turing pattern. This has been described in an article entitled "The Chemical Basis of Morphogenesis" by A. Turing.

The above biological phenomena have been investigated mainly for analytical purposes. More recently, however, the principles that underlie the movement of some invertebrates have been studied with a view toward applying them to the movement of mechanical or electro-mechanical systems. The movement of all mechanical systems used in robotics and industrial automation is currently provided by digital microprocessor systems arranged to control the synchronization of movement. These digital systems are programmed to allow the mechanical system driven thereby to perform a predetermined sequence of operations and follow preset paths of movement.

While being advantageous in many ways, current approaches have several drawbacks. For example, the cost of the control arrangement increases with the complexity of the movement involved, i.e., with the number of actuators and state variables to be controlled. Also, the actuating system structure has a low flexibility.

An analytical representation and a mathematical model describing the phenomenon of locomotion in invertebrates has been used for implementing an analog device which allows the movement of multi-actuator mechanical systems to be controlled. This device is disclosed in European Patent Application No. 98830658.5 assigned to the assignee of the present invention. This device relates to a cellular architecture of the (RD-CNN) reaction diffusion—cellular neural network (RD-CNN). It is shown, in fact, that RD-CNN cells provide a good support with the reproduction of complex phenomena. This is, therefore, an analytical type of approach orientated towards an implementation by analog circuits where the value of the state variable of each RD-CNN cell represents the state of the individual entity that forms the structure, subjected to space discretization.

In particular, the circuitry described in the above reference is directed essentially to providing an analytical expression of the function f( ). That is, of the operator $\nabla^2$ through a transconductance function which can be programmed using control voltage values for each parameter. While providing numerous advantages, it may be difficult to implement in a digital device built with VLSI CMOS technology. In addition, pressing demands for control of the movement of multi-actuator systems require a modular construction of the control apparatus which can be re-configured to suit the layout of the control actuator network. However, this cannot be achieved with the approaches provided by the prior art.

The underlying technical problem of this invention is to provide an electronic circuit with structural and functional features that allow the movements of a multi-actuator electro-mechanical system to be controlled, and the limitations and drawbacks of prior art digital control systems to be overcome.

SUMMARY OF THE INVENTION

The concept behind the present invention involves using a cellular architecture having both algebraic and fuzzy calculation capabilities to provide space/time control of movement in a flexible, modular manner. In other words, the invention uses fuzzy microcontrollers with Boolean calculation capability to control the movement of multi-actuator mechanical systems.

According to the invention, a programmable electronic circuit for controlling movements of a multi-actuator electro-mechanical system of a type associated with a cellular architecture includes a plurality of actuators, a plurality of programmable cells associated with the plurality of actuators and interconnected locally, and a processing control unit including a fuzzy electronic microcontroller associated with the plurality of programmable cells. The plurality of programmable cells may provide a mathematical representation of a locomotive phenomenon and a corresponding conversion of the representation of the locomotive phenomenon to commands for driving the plurality of actuators.

More particularly, the processing control unit may perform Boolean calculations. Furthermore, the electronic circuit may include a first, volatile memory bi-directionally connected to the processing control unit, a second, non-volatile memory bi-directionally connected to the processing control unit, a third, non-volatile memory bi-directionally connected to the processing control unit, and an analog-to-digital converter bi-directionally connected to the processing control unit. The analog-to-digital converter may provide demultiplexing functions for driving the plurality of actuators.

Additionally, the processing control unit may work on a fuzzy model of a cell having at least two state variables. Four input variables coincident at a time are processed with a value provided by the at least two state variables of the cell at the time, and two variables are output. Also, each actuator may be driven by a control signal based upon a state of a single cell, where the control signal is updated by the processing control unit.

A method of controlling movements of a multi-actuator electro-mechanical system according to the invention includes providing a mathematical representation of a locomotive phenomenon, converting the representation of the locomotive phenomenon to commands through a cellular architecture associated with a plurality of actuators, and providing resolution of fuzzy inference rules using the cellular architecture. The resolution may be provided by updating the commands at a processing time responsive to a type of movement to be provided by the plurality of actuators.

BRIEF DESCRIPTION OF THE DRAWINGS

The features and advantages of an electronic circuit according to the present invention will become apparent from the following description of an embodiment thereof, given by way of non-limitative example, with reference to the accompanying drawings.

DETAILED DESCRIPTION OF THE PREFERRED EMBODIMENTS

Figure 3:
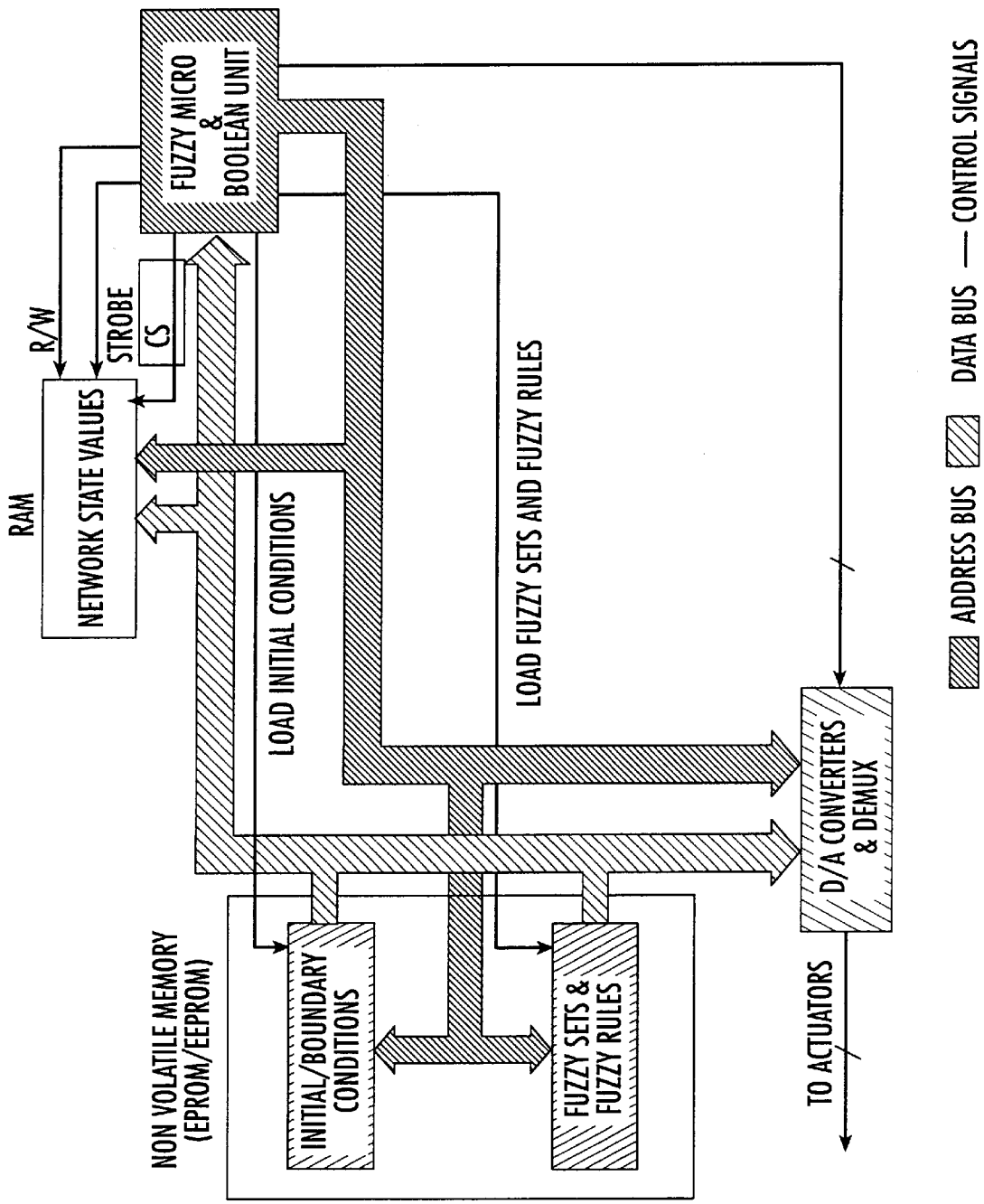
FIG. 3 is a schematic block diagram of an electronic circuit according to the present invention.

Referring now to FIG. 3, fuzzy circuit architecture 1 according to the present invention for controlling the movement of a multi-actuator electro-mechanical system is shown. An electro-mechanical system may be thought of as an aggregate of actuators. For example, the actuators may be piezoelectric, electric motors, actuators for use in robotics and industrial automation, or actuators for micro-robotics applications. The latter usually require fast dynamics.

A matrix of locally interconnected analog cells is associated with the electro-mechanical system. Each cell represents a hardware implementation of a fuzzy model of inference rules, described hereinafter. The basic model of an individual cell is described by a dynamic system with two state variables per cell. Furthermore, a non-linear relationship is provided between the state variables and the corresponding outputs of each cell.

As disclosed in the aforementioned European Application No. 98830658.5, which is hereby incorporated herein in its entirety by reference, the dynamic action of each cell, in combination with a diffusion phenomenon among the cells themselves, results in an overall behavior. This behavior may be likened to a reaction diffusion phenomenon having similar features in various chemical-physical phenomena and in the propagation of autonomous motion-generating waves.

The interaction between adjacent cells allows, through a spatial diffusion process, the oscillations to propagate from one cell to another in the set. A wave phenomenon having the characteristics of an auto-wave is thereby generated. Thus, the invention is directed to a programmable electronic circuit capable of generating a predetermined sequence of commands which cause wave phenomena and allow locomotion actuators to be controlled. Programming such a device may include providing a suitable set with starting and edge conditions, as well as a specific program for the parameters of each cell.

Each cell is in communication with its adjacent cells through each component of the state variables. In particular, cells communicate with one another through state variables filtered by a non-linear function. The cells are substantially all identical, except for those located along the outer edges of the matrix. Edge conditions of the cells along the outer edges of the matrix may be specified according to a particular mode of operation, such as auto-wave generating, spatial pattern generating, and auto-wave controlling, for example. The cell interconnect parameters as well as the diffusion and starting condition parameters may be programmed using suitable memory devices adapted to store such information. In particular, the diffusion model includes two discrete sets of fuzzy rules, described below.

The circuit 1 according to the present invention is formed according to a fuzzy architecture which may be implemented as an integrated circuit with VLSI CMOS technology, for example. Alternatively, the invention could be implemented in the form of a discrete component board, or with other suitable techniques known to those of skill in the art. The fuzzy architecture 1 duplicates the reaction diffusion mechanism which follows the equation (1), but using a fuzzy neural network.

This fuzzy neural network defines the functional relationships which are capable of duplicating simultaneous reaction diffusion (RD) equations system. Advantageously, this simultaneous equation system is duplicated by two sets of fuzzy rules effective to process, in a linguistic manner, the state variables of a plurality of cells. Furthermore, a dynamic of the "slow-fast" type is imposed on each cell, i.e., an oscillatory motion in which two dynamic processes coexist with deeply different kinetic characteristics.

Since the biological phenomenon of interest is characterized by simultaneous differential equations of at least the second order, the use of a fuzzy cellular network having at least two levels (i.e., two state variables $x_1$, $x_2$ per cell) is convenient. According to the present invention, a device is advantageously provided which can be programmed in a linguistic manner and is capable of generating that phenomenon in order to control locomotion actuators. It should be noted that the word "programming" as applied to such device is used herein as providing a suitable set with linguistic rules which describe the behavior of each cell and its interactions with the neighboring cells, as well as the ability to set the starting and edge conditions as appropriate.

In the fuzzy architecture 1, the fuzzy model of an individual cell having two state variables processes four input variables and outputs two variables. In particular, two of the four inputs are coincident, at each time k, with the value taken by the two state variables of the cell at that time k. The remaining inputs take the value of those variables at a preceding time k−1.

The result of defuzzyfying the fuzzy architecture 1 provides the increments to be added algebraically to the two state variables at the time k in order to obtain their values taken at the time k+1. A model is provided for each of the four input variables, which is represented by a set of membership functions, where the value of the outputs (i.e., of the increments to be added to the state variables) is determined.

The following thirty two fuzzy rules are provided to more fully describe the slow-fast type of oscillatory dynamics of the individual cell. As noted above, $x_1$ and $x_2$ denote respectively the values of the state variables of the two layers, and k is the processing time.

1) If $x_1(k-1)$ Is Low And $x_2(k-1)$ Is Low And $x_1(k)$ Is Low And $x_2(k)$ Is Low Then $\Delta x_1(k+1)$ Is $\Delta X_1\_1$ And $\Delta x_2(k+1)$ Is $\Delta X_2\_1$
2) If $x_1(k-1)$ Is Low And $x_2(k-1)$ Is Low And $x_1(k)$ Is Small_Low And $x_2(k)$ Is Low Then $\Delta x_1(k+1)$ Is $\Delta X_1\_5$ And $\Delta x_2(k+1)$ Is $\Delta X_2\_5$
3) If $x_1(k-1)$ Is Low And $x_2(k-1)$ Is Small_Low And $x_1(k)$ Is Low And $x_2(k)$ Is Low Then $\Delta x_1(k+1)$ Is $\Delta X_1\_17$ And $\Delta x_2(k+1)$ Is $\Delta X_2\_17$
4) If $x_1(k-1)$ Is Low And $x_2(k-1)$ Is Small_Low And $x_1(k)$ Is Low And $x_2(k)$ Is Small_Low Then $\Delta x_1(k+1)$ Is $\Delta X_1\_18$ And $\Delta x_2(k+1)$ Is $\Delta X_2\_18$
5) If $x_1(k-1)$ Is Low And $x_2(k-1)$ Is Small_High And $x_1(k)$ Is Low And $x_2(k)$ Is Small_Low Then $\Delta x_1(k+1)$ Is $\Delta X_1\_34$ And $\Delta x_2(k+1)$ Is $\Delta X_2\_34$
6) If $x_1(k-1)$ Is Low And $x_2(k-1)$ Is Small_High And $x_1(k)$ Is Low And $x_2(k)$ Is Small_High Then $\Delta x_1(k+1)$ Is $\Delta X_1\_35$ And $\Delta x_2(k+1)$ Is $\Delta X_2\_35$
7) If $x_1(k-1)$ Is Low And $x_2(k-1)$ Is High And $x_1(k)$ Is Low And $x_2(k)$ Is Small_High Then $\Delta x_1(k+1)$ Is $\Delta X_1\_51$ And $\Delta x_2(k+1)$ Is $\Delta X_2\_51$
8) If $x_1(k-1)$ Is Low And $x_2(k-1)$ Is High And $x_1(k)$ Is Low And $x_2(k)$ Is High Then $\Delta x_1(k+1)$ Is $\Delta X_1\_52$ And $\Delta x_2(k+1)$ Is $\Delta X_2\_52$
9) If $x_1(k-1)$ Is Small_Low And $x_2(k-1)$ Is Low And $x_1(k)$ Is Small_Low And $x_2(k)$ Is Low Then $\Delta x_1(k+1)$ Is $\Delta X_1\_69$ And $\Delta x_2(k+1)$ Is $\Delta X_2\_69$
10) If $x_1(k-1)$ Is Small_Low And $x_2(k-1)$ Is Low And $x_1(k)$ Is Small_High And $x_2(k)$ Is Low Then $\Delta x_1(k+1)$ Is $\Delta X_1\_73$ And $\Delta x_2(k+1)$ Is $\Delta X_2\_73$
11) If $x_1(k-1)$ Is Small_Low And $x_2(k-1)$ Is Small_Low And $x_1(k)$ Is Small_Low And $x_2(k)$ Is Low Then $\Delta x_1(k+1)$ Is $\Delta X_1\_85$ And $\Delta x_2(k+1)$ Is $\Delta X_2\_85$
12) If $x_1(k-1)$ Is Small_Low And $x_2(k-1)$ Is Small_Low And $x_1(k)$ Is Small_Low And $x_2(k)$ Is Small_Low Then $\Delta x_1(k+1)$ Is $\Delta X_1\_86$ And $\Delta x_2(k+1)$ Is $\Delta X_2\_86$
13) If $x_1(k-1)$ Is Small_Low And $x_2(k-1)$ Is Small_High And $x_1(k)$ Is Small_Low And $x_2(k)$ Is Small_Low Then $\Delta x_1(k+1)$ Is $\Delta X_1\_102$ And $\Delta x_2(k+1)$ Is $\Delta X_2\_102$
14) If $x_1(k-1)$ Is Small_Low And $x_2(k-1)$ Is Small_High And $x_1(k)$ Is Small_Low And $x_2(k)$ Is Small_High Then $\Delta x_1(k+1)$ Is $\Delta X_1\_103$ And $\Delta x_2(k+1)$ Is $\Delta X_2\_103$
15) If $x_1(k-1)$ Is Small_Low And $x_2(k-1)$ Is High And $x_1(k)$ Is Low And $x_2(k)$ Is High Then $\Delta x_1(k+1)$ Is $\Delta X_1\_116$ And $\Delta x_2(k+1)$ Is $\Delta X_2\_116$
16) If $x_1(k-1)$ Is Small_Low And $x_2(k-1)$ Is High And $x_1(k)$ Is Small_Low And $x_2(k)$ Is High Then $\Delta x_1(k+1)$ Is $\Delta X_1\_120$ And $\Delta x_2(k+1)$ Is $\Delta X_2\_120$ -continued 17) If x1(k − 1) Is Small_High And x2(k − 1) Is Low And x1(k) Is Small_High And x2(k) Is Low Then Δx1(k + 1) Is ΔX1_137 And Δx2(k + 1) Is ΔX2_137
18) If x1(k − 1) Is Small_High And x2(k − 1) Is Low And x1(k) Is High And x2(k) Is Low Then Δx1(k + 1) Is ΔX1_141 And Δx2(k + 1) Is ΔX2_141
19) If x1(k − 1) Is Small_High And x2(k − 1) Is Small_Low And x1(k) Is Small_High And x2(k) Is Small_Low Then Δx1(k + 1) Is ΔX1_154 And Δx2(k + 1) Is ΔX2_154
20) If x1(k − 1) Is Small_High And x2(k − 1) Is Small_Low And x1(k) Is Small_High And x2(k) Is Small_High Then Δx1(k + 1) Is ΔX1_155 And Δx2(k + 1) Is ΔX2_155
21) If x1(k − 1) Is Small_High And x2(k − 1) Is Small_High And x1(k) Is Small_Low And x2(k) Is Small_High Then Δx1(k + 1) Is ΔX1_167 And Δx2(k + 1) Is ΔX2_167
22) If x1(k − 1) Is Small_High And x2(k − 1) Is Small_High And x1(k) Is Small_High And x2(k) Is Small_High Then Δx1(k + 1) Is ΔX1_171 And Δx2(k + 1) Is ΔX2_171
23) If x1(k − 1) Is Small_High And x2(k − 1) Is High And x1(k) Is Small_Low And x2(k) Is High Then Δx1(k + 1) Is ΔX1_184 And Δx2(k + 1) Is ΔX2_184
24) If x1(k − 1) Is Small_High And x2(k − 1) Is High And x1(k) Is Small_High And x2(k) Is High Then Δx1(k + 1) Is ΔX1_188 And Δx2(k + 1) Is ΔX2_188
25) If x1(k − 1) Is High And x2(k − 1) Is Low And x1(k) Is High And x2(k) Is Low Then Δx1(k + 1) Is ΔX1_205 And Δx2(k + 1) Is ΔX2_205
26) If x1(k − 1) Is High And x2(k − 1) Is Low And x1(k) Is High And x2(k) Is Small_Low Then Δx1(k + 1) Is ΔX1_206 And Δx2(k + 1) Is ΔX2_206
27) If x1(k − 1) Is High And x2(k − 1) Is Small_Low And x1(k) Is High And x2(k) Is Small_Low Then Δx1(k + 1) Is ΔX1_222 And Δx2(k + 1) Is ΔX2_222
28) If x1(k − 1) Is High And x2(k − 1) Is Small_Low And x1(k) Is High And x2(k) Is Small_High Then Δx1(k + 1 ) Is ΔX1_223 And Δx2(k + 1) Is ΔX2_223
29) If x1(k − 1) Is High And x2(k − 1) Is Small_High And x1(k) Is High And x2(k) Is Small_High Then Δx1(k + 1) Is ΔX1_239 And Δx2(k + 1) Is ΔX2_239
30) If x1(k − 1) Is High And x2(k − 1) Is Small_High And x1(k) Is High And x2(k) Is High Then Δx1(k + 1) Is ΔX1_240 And Δx2(k + 1) Is ΔX2_240
31) If x1(k − 1) Is High And x2(k − 1) Is High And x1(k) Is Small_High And x2(k) Is High Then Δx1(k + 1) Is ΔX1_252 And Δx2(k + 1) Is ΔX2_252
32) If x1(k − 1) Is High And x2(k − 1) Is High And x1(k) Is High And x2(k) Is High Then Δx1(k + 1) Is ΔX1_256 And Δx2(k + 1) Is ΔX2_256

The dynamics provided with the individual cells, in combination with a phenomenon of diffusion through the cells, result in an overall behavior which may be likened to a reaction diffusion process responsible for the propagation of autonomous waves. The diffusion mechanism underlies the interaction of each cell with the neighboring cells. From a strictly mathematical standpoint, this action can be modeled by applying an approximate Laplacian operator to the non-linear outputs of the network cells.

Figure 1A:
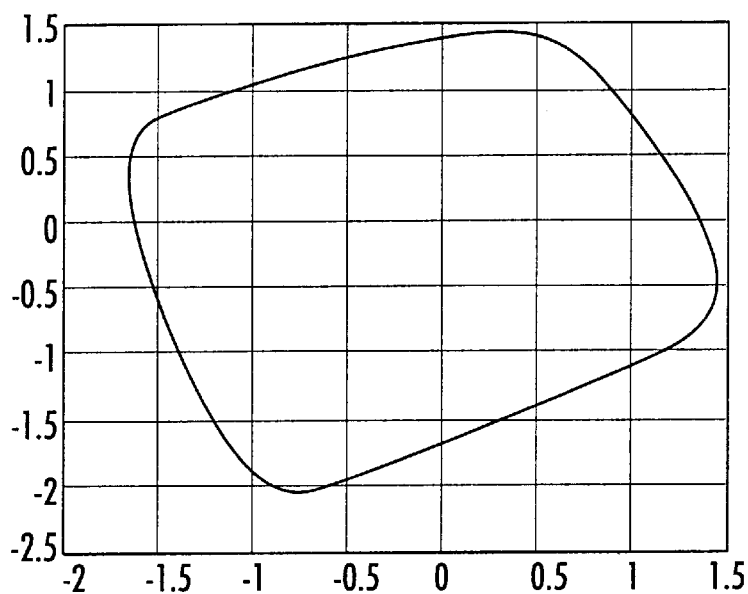
FIG. 1a is a two-dimensional phase graph illustrating the dynamics in a plane of the phases of a state variable associated with a single auto-wave generating cell according to the present invention.
Figure 1B:
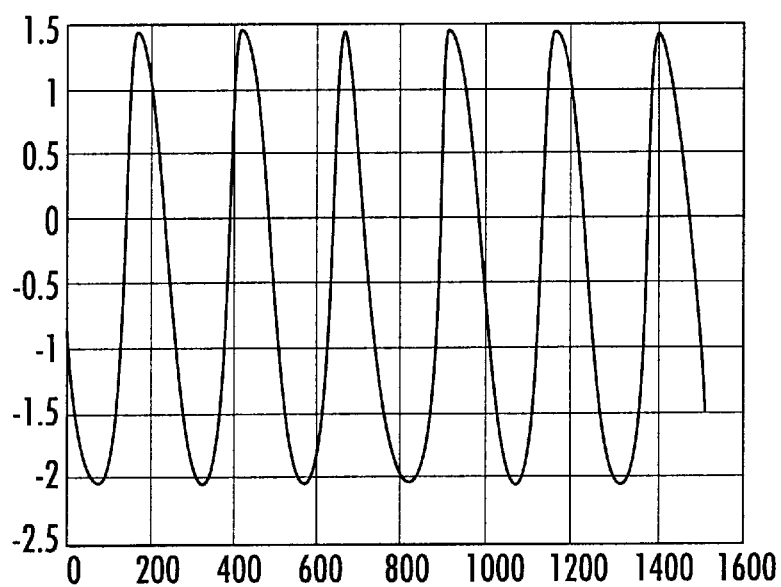
FIG. 1b is a timing graph illustrating an analysis of the dynamics in the time domain of a pair of state variables associated with an auto-wave generating cell according to the present invention.
Figure 2:
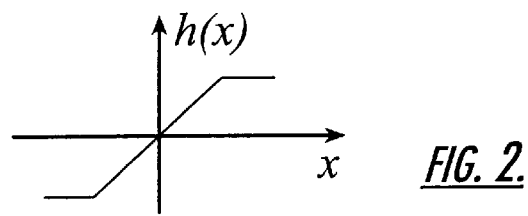
FIG. 2 is graph showing the approximate behavior of the state/output link of an auto-wave generating cell according to the present invention.

The non-linear link between the state and the output, which for this specific analytical model is illustrated by the linear function shown in FIG. 2, is provided by a set of linguistic rules with an input and an output. The fuzzy model of this invention includes two sub-models. A first sub-model calculates the output value of each cell. A second sub-model processes the extent of the diffusion.

To calculate the output value of each cell, the fuzzy model works on a single input variable which is represented by the value of the cell's own state. The following fuzzy rules describe the three linear zones of the state/output link shown in FIG. 2:

1) If x Is Low Then out Is negative;
2) If x is Medium Then out Is zero;
3) If x is High Then out Is positive;

The approximate model of the Laplacian operator is given by the following relation:

$$\nabla^2 y_{i,j} = y_{i,j-1} + y_{i,j+1} + y_{i-1,j} + y_{i+1,j} + 4^* y_{i,j} \quad (2)$$

where, $y_{i,j}$ is the output value of a cell identified by the coordinates i and j.

The fuzzy model used for the Laplacian operator processes, in a linguistic manner, two IF parts, i.e., the "center" and "environ." These values correspond respectively to the cell's own value (i.e., to $y_{i,j}$) and the value taken by its environ, which is the sum of the four outputs entered in relation (2).

1) If x Is Low And Nr Is Low Then F2 Is Zero.
2) If x Is Low And Nr Is Medium Then F2 Is SmallPos.
3) If x Is Low And Nr Is High Then F2 Is Positive.
4) If x Is Medium And Nr Is Low Then F2 Is SmallNeg.
5) If x Is Medium And Nr Is Medium Then F2 Is Zero.
6) If x Is Medium And Nr Is Low Then F2 Is SmallPos.
7) If x Is High And Nr Is Low Then F2 Is Negative.
8) If x Is High And Nr Is Low Medium F2 Is SmallNeg.
9) If x Is High And Nr Is High Then F2 Is Zero.

The combined application of both fuzzy sub-models to the state variables of the network supplies the value of the Laplacian. The Laplacian operator and the non-linear function are both unrelated to the evaluated network layer. Thus, the same fuzzy model, or rather the same two sub-models, are applied to both levels, although at different times. In essence, the previous set of fuzzy rules includes three IF parts and two THEN parts.

The circuit structure of the architecture 1 of this invention will now be described. It includes a process control unit 2 having a fuzzy type of electronic microcontroller with Boolean calculation capability. The unit 2 may be, for example, a fuzzy processor having at least four inputs for the IF part of the inference rules and at least two outputs for the THEN part of the rules.

The unit 2 is connected bi-directionally to the following circuit blocks: a first memory 3, such as a volatile RAM; a second memory 4, such as a non-volatile EPROM or EEPROM or flash memory; a third memory 5, such as a second non-volatile memory; and an analog-to-digital converter 6 also serving demultiplexer functions for driving output connected actuators. Values of the cell states for each layer are stored in the first volatile memory 3. This memory 3 may also be connected to the architecture 1 as an external unit and communicate with the architecture 1 through an interface.

The first, non-volatile memory 4 is programmed with the starting conditions of the network cells and their edge conditions. This memory may be embedded in the processing unit 2. The second, non-volatile memory 5 is programmed with the fuzzy set and fuzzy rule parameters. The process control unit 2 loads the starting conditions for the system in the form of suitable parameters loaded in the memory 3. Concurrently therewith, the memories 4, 5 are loaded with the parameters of the membership functions and the fuzzy rules that should be applied to the cell network.

In accordance with the method previously described in connection with the two sub-sets of fuzzy rules modeling the diffusion phenomenon, the network values are updated at each time arranged by the circuit timing. Thus, at each processing time, a data item is delivered to the converter 6 for addressing and activating a corresponding actuator. Instead of using the non-volatile memories 4 and 5 to program the starting and edge conditions of the fuzzy block parameters, an interface to an external processor of the architecture 1 could be provided.

Figure 4:
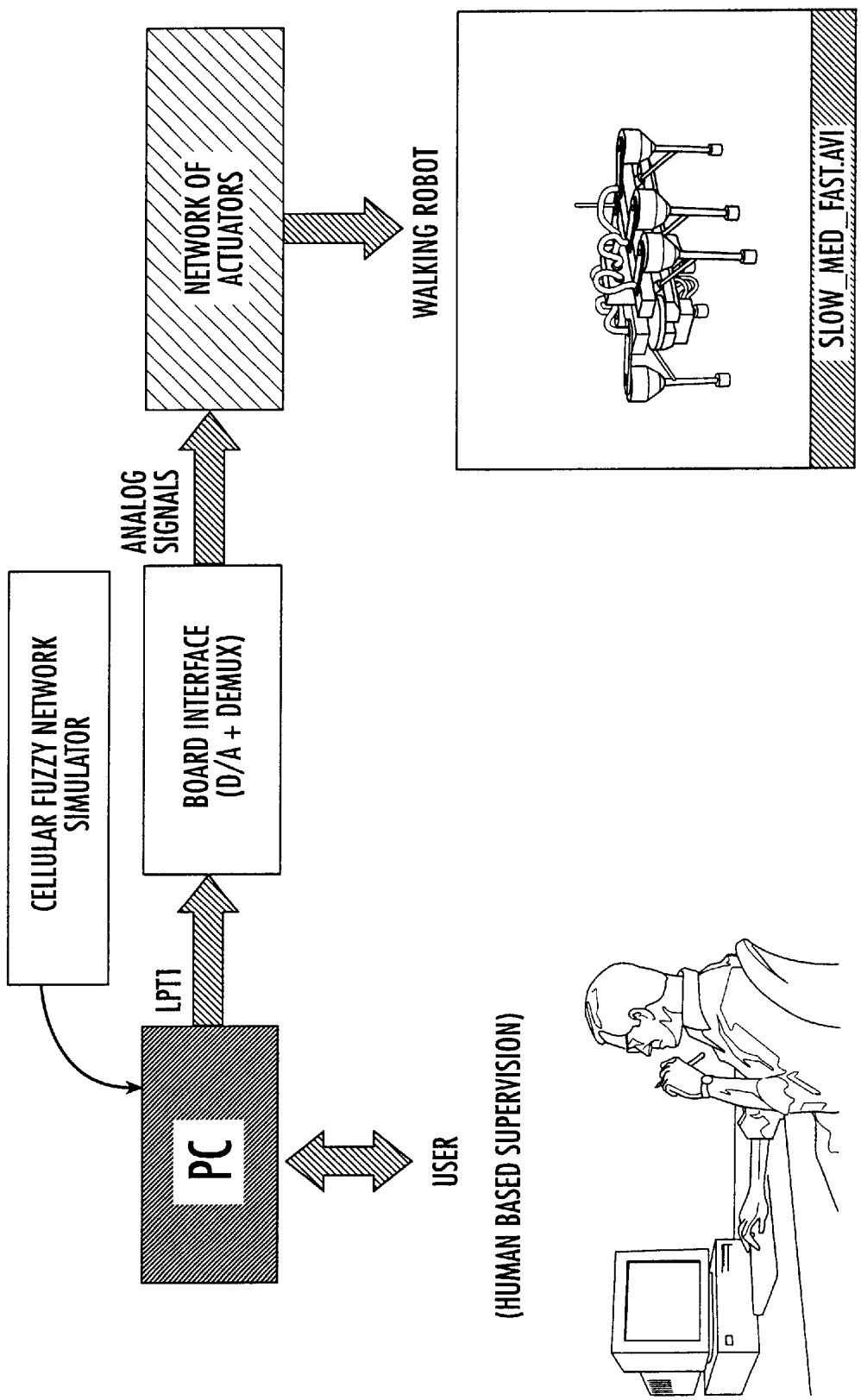
FIG. 4 is a schematic diagram illustrating an exemplary application of the circuit of FIG. 3.

One possible connection to an electronic or external processor PC is shown by way of example in FIG. 4. This allows a user to program with a high level language the type of the dynamics sought according to the specific movement of the actuators associated with the circuit of this invention. Also shown in FIG. 4 is an exemplary interface between the external processor PC and the actuator network of a six-limb robot driven by an electronic circuit according to the invention. In this system, the motive waves are generated with the intermediary of a simulation code of the three sets of fuzzy instructions described above. The data provided by processing these instructions is converted to electric signals through the circuit according to the invention.

The fuzzy circuit architecture of the present invention has the following features. First, it is a cellular architecture with capabilities for both algebraic and fuzzy calculations, and it may be implemented in a digital device with VLSI CMOS technology, for example. Further, the resulting control system is modular. The hardware structure is easy to re-configure to suit a specific design of the actuator network to be controlled. In particular, each actuator is driven by the control signal relating to the state of a single cell, which is updated each time by the combination of the fuzzy systems.

Additionally, the motion of each actuator is closely dependent upon that of the neighboring actuators, by virtue of the diffusion process enacted by the laws which govern the interconnections between cells. The resulting motion is, therefore, organized in space and time. Furthermore, the approach adopted makes the system "programmable" as a whole. Different "wave flows" can be created by setting for each the direction of propagation by a linguistic description of the phenomenon. In particular, the embodiment proposed affords, in addition to a high degree of movement control, a simpler immediate system programming by utilizing the distinctive feature of fuzzy logic. A desired type of motion of the set of actuators can be controlled by simply selecting a specific set of fuzzy rules.

To summarize, the fuzzy circuit architecture of the present invention allows modular devices to be controlled for moving objects (such as the so-called smart conveyors) or robots capable of self-induced movements. Emulation of a large number of types of motion inspired by biological systems is also provided according to the present invention.

That which is claimed is:

1. A programmable electronic circuit for controlling movements of a multi-actuator electro-mechanical system of a type associated with a cellular architecture and comprising a plurality of actuators and a plurality of programmable cells interconnected locally and associated with the plurality of actuators, the plurality of programmable cells providing a mathematical representation of a locomotive phenomenon and a corresponding conversion of the representation of the locomotive phenomenon to commands for driving the plurality of actuators, the programmable electronic circuit comprising:

a processing control unit comprising a fuzzy electronic microcontroller connected to the multi-actuator electro-mechanical system, said processing control unit also performing Boolean calculations.

2. The electronic circuit according to claim 1 further comprising:

a volatile memory connected to said processing control unit;

at least one non-volatile memory connected to said processing control unit; and an analog-to-digital converter connected to said processing control unit and providing demultiplexing functions for driving the plurality of actuators.

3. The electronic circuit according to claim 1 wherein said processing control unit works on a fuzzy model of a cell having at least two state variable to process four input variables coincident at a time with a value provided by the at least two state variables of the cell at the time, and to output two variables.

4. The electronic circuit according to claim 1 wherein each actuator is driven by a control signal based upon a state of a single cell, the control signal being updated by said processing control unit.

5. An electro-mechanical system comprising:

a plurality of actuators;

a plurality of programmable cells interconnected locally and connected to said plurality of actuators, said plurality of programmable cells providing a mathematical representation of a locomotive phenomenon and a corresponding conversion of the representation of the locomotive phenomenon to commands for driving the plurality of actuators; and a processing control unit comprising a fuzzy electronic microcontroller connected to said plurality of programmable cells, said processing control unit also performing Boolean calculations.

6. The system according to claim 5 further comprising:

a volatile memory connected to said processing control unit;

at least one non-volatile memory connected to said processing control unit; and an analog-to-digital converter connected to said processing control unit and providing demultiplexing functions for driving said plurality of actuators.

7. The system according to claim 5 wherein said processing control unit works on a fuzzy model of a cell having at least two state variables to process four input variables coincident at a time with a value provided by the at least two state variables of the cell at the time, and to output two variables.

8. The system according to claim 5 wherein each actuator is driven by a control signal based upon a state of a single cell, the control signal being updated by said processing control unit.

9. An electro-mechanical system comprising;

a plurality of actuators;

a plurality of cello interconnected locally and associated with said plurality of actuators, said plurality of cells providing a mathematical representation of a locomotive phenomenon and a corresponding conversion of the representation of the locomotive phenomenon to commands for driving the plurality of actuators; and a processing control unit comprising a fuzzy electronic microcontroller connected to said plurality of cells, said processing control unit also performing Boolean calculations.

10. The system according to claim 9 wherein said plurality of cells are programmable.

11. The system according to claim 9 further comprising:

a volatile memory connected to said processing control unit;

at least one non-volatile memory connected to said processing control unit; and an analog-to-digital converter connected to said processing control unit and providing demultiplexing functions for driving said plurality of actuators.

12. The system according to claim 9 wherein said processing control unit works on a fuzzy model of a cell having at least two stats variables to process four input variables coincident at a time with a value provided by the at least two state variables of the cell at the time, and to output two variables.

13. The system according to claim 9 wherein each actuator is driven by a control signal based upon a state of a single cell, the control signal being updated by said processing control unit.

14. A method of controlling movements of a multi-actuator electro-mechanical system comprising;

providing a mathematical representation of a locomotive phenomenon;

converting the representation of the locomotive phenomenon to commands through a cellular architecture associated with a plurality of actuators; and performing Boolean calculations and providing resolution of fuzzy inference rules using the cellular architecture by updating the commands at a processing time responsive to a type of movement to be provided by the plurality of actuators.

15. The method according to claim 14 wherein the cellular architecture includes at least one fuzzy controller.

16. The method according to claim 14 wherein the commands are generated by oscillations of corresponding mutually connected cells.

17. The method according to claim 16 wherein an interaction between adjacent cells produces a process of spatial diffusion of oscillations propagated from one cell to another to generate a wave phenomenon of an auto-wave type.

18. The method according to claim 14 wherein a mathematical model associated with each cell is represented by a dynamic system of fuzzy rules with two state variables wherein a non-linear relationship is provided between the two state variables and corresponding outputs of each cell according to the following set of relations:

If x Is Low Then out Is negative;
If x is Medium Then out Is zero; and
If x is High Then out Is positive.

19. The method according to claim 14 wherein a motive diffusion is defined by the following set of fuzzy relations:

If x Is Low And Nr Is Low Then out Is Zero;
If x Is Low And Nr Is Medium Then out Is SmallPos;
If x Is Low And Nr Is High Then out Is Positive;
If x Is Medium And Nr Is Low Then out Is SmallNeg;
If x Is Medium And Nr Is Medium Then out Is Zero;
If x Is Medium And Nr Is Low Then out Is SmallPos;
If x Is High And Nr Is Low Then out Is Negative;
If x Is High And Nr Is Low Medium Then out Is SmallNeg; and
If x Is High And Nr Is High Then out Is Zero.

20. A method of controlling movements of a multi-actuator electro-mechanical system comprising:

providing a mathematical representation of a locomotive phenomenon;

converting the representation of the locomotive phenomenon to commands; and performing algebraic calculations and providing resolution of fuzzy inference rules by updating the commands at a processing time responsive to a type of movement to be provided by a plurality of actuators.

21. The method according to claim 20 wherein converting comprises converting using a cellular architecture associated with the plurality of actuators.

22. The method according to claim 20 wherein the resolution is provided by a cellular architecture associated with the plurality of actuators.

23. The method according to claim 22 wherein the cellular architecture includes at least one fuzzy controller.

24. The method according to claim 20 wherein the commands are generated by oscillations of corresponding mutually connected cells.

25. The method according to claim 24 wherein an interaction between adjacent cells produces a process of spatial diffusion of oscillations propagated from one cell to another to generate a wave phenomenon of an auto-wave type.

26. The method according to claim 20 wherein a mathematical model associated with each cell is represented by a dynamic system of fuzzy rules with two state variables wherein a non-linear relationship is provided between the two state variables and corresponding outputs of each cell according to the following set of relations:

If x Is Low Then out Is negative;
If x is Medium Then out Is zero; and
If x is High Then out Is positive.

27. The method according to claim 20 wherein a motive diffusion is defined by the following set of fuzzy relations:

If x Is Low And Nr Is Low Then out Is Zero;
If x Is Low And Nr Is Medium Then out Is SmallPos;
If x Is Low And Nr Is High Then out Is Positive;
If x Is Medium And Nr Is Low Then out Is SmallNeg;
If x Is Medium And Nr Is Medium Then out Is Zero;
If x Is Medium And NR Is Low Then out Is SmallPos;
If x Is High And Nr Is Low Then out Is Negative;
If x Is High And Nr Is Low Medium Then out Is SmallNeg; and
If x Is High And Nr Is High Then out Is Zero.

* * * * *

UNITED STATES PATENT AND TRADEMARK OFFICE
CERTIFICATE OF CORRECTION

PATENT NO. : 6,728,687 B2
DATED : April 27, 2004
INVENTOR(S) : Paolo Arena et al.

It is certified that error appears in the above-identified patent and that said Letters Patent is hereby corrected as shown below:

Column 10,
Line 66, delete "cello" insert -- cells --

Column 11,
Line 22, delete "stats" insert -- state --

Signed and Sealed this

Twenty-second Day of June, 2004

JON W. DUDAS
*Acting Director of the United States Patent and Trademark Office*